United States Patent Office 2,887,368
Patented May 19, 1959

2,887,368
AUTOMOTIVE FUEL

John P. Buckmann, Yorba Linda, Calif., assignor to Union Oil Company of California, Los Angeles, Calif., a corporation of California No Drawing. Application February 28, 1957
Serial No. 642,950

9 Claims. (Cl. 44—69)

This invention relates to internal combustion engine fuels for use in modern high compression automotive engines, aircraft engines and the like. More particularly it relates to gasolines which produce a smaller octane requirement increase (ORI) when used in internal combustion engines, e.g., automotive engines than ordinary gasolines.

It is well known that a clean engine, i.e. one from which deposits within the combustion chambers have been removed, has a lower octane requirement than does an engine which has been operated until the amount of deposits within the combustion chambers has reached equilibrium such as is or may be obtained by operating the engine with a given fuel for the equivalent of 3000 to 7000 or more road miles.

By the term "octane requirement" of an engine is meant the octane number or rating of a fuel which just prevents knocking (audible knock upon acceleration) of the engine. By the term "octane requirement increase" or "ORI" of an engine is meant that difference in octane requirement of an engine containing combustion chamber deposits as compared with the same engine from which combustion chamber deposits have been removed. Although the ORI refers to the increase in octane requirement of an engine the term will be applied to a fuel herein in the following sense. A gasoline or fuel which causes large ORI values in an engine will be referred to as one having a high ORI. Conversely a fuel which causes only small ORI values in an engine will be referred to as one having a low ORI. Furthermore additives described herein are said to reduce the ORI characteristics of the fuel, meaning that the fuel containing the additives will, on use in an engine, cause less octane requirement increase in the engine than will the base fuel without such additives.

It is known that starting with a clean engine the octane requirement of the engine increases as combustion chamber deposits build up in the engine and continues to increase until an equilibrium amount and possibly kind of deposits are formed. Other factors influencing the octane requirement include the condition of intake and exhaust valves, carburetor, and ignition system including breaker points, spark plugs, etc.

With commercial automotive fuels, e.g., gasolines of various grades available on the market it is found that the ORI of automotive engines will generally be in the order of 6 to 15 or more octane numbers. Such increases in octane requirements are highly objectionable as is well known since the higher the octane requirement the higher the cost of fuel necessary to operate the engine efficiently.

It is an object of this invention to provide an internal combustion engine fuel containing an additive material which imparts to the gasoline lowered or reduced ORI characteristics.

It is another object of this invention to provide a gasoline suitable for use in modern high compression automotive internal combustion engines which gasoline does not increase the octane requirement of an engine to an objectionable degree, and at least the use of which does not cause an ORI in the engine which is as great as that caused by the use of such fuels without the ORI additive.

A particular object of this invention is to provide a gasoline suitable for use in present day high compression internal combustion automotive engines which contains anti-knock agents such as tetraethyl lead (T.E.L.), antioxidants and/or gum inhibitors and to which is added small amounts of an agent or agents which reduce the ORI characteristics of the gasoline.

It has been found that by adding small amounts of certain low molecular weight aliphatic hydrocarbon nitriles to automotive gasolines, engines operating on the resulting fuels show an ORI substantially less than the corresponding ORI observed with the same gasolines which do not contain this additive.

By the term internal combustion engine fuel suitable for use in high compression automotive and aircraft engines, or merely the term gasoline, is meant a composition boiling in the gasoline boiling range and consisting essentially of hydrocarbons boiling in the range of about −40° F. to about 430° F. The composition may contain tetraethyl lead and/or oxidation inhibitor as more fully described hereinbelow. For the purposes of this invention and in order to gain the advantages of this invention the composition will also contain the low molecular weight aliphatic nitriles in the amounts and of the types described hereinbelow.

The low molecular weight aliphatic hydrocarbon nitriles include those nitriles containing 2, 3 or 4 carbon atoms per molecule. Thus acetonitrile, propionitrile, and the butyronitriles such as the normal and the iso, the latter being isopropyl cyanide, are the useful nitriles. These nitriles are all aliphatic hydrocarbon mononitriles. Higher molecular weight nitriles do not appear to be effective in reducing ORI.

The amount of nitrile to be employed will be between about 0.5 and about 25 ml. per gallon of gasoline which corresponds to between about 0.015% and 0.75% by weight. Larger amounts are not as effective and are uneconomical to use. Smaller amounts appear to have some effect but unless about the amount indicated by the lower limit is employed the decrease in ORI is small.

Gasolines or automotive fuels to which the lower alkyl nitriles may be added to produce the lowered ORI effect include substantially all grades of gasoline presently being employed in automotive and internal combustion aircraft engines. Such gasolines may be prepared from saturated hydrocarbons, e.g., straight-run stocks, alkylation products, and the like, with or without gum inhibitors, and with or without soluble lead compounds as for example tetraethyl lead, T.E.L., or ethyl fluid. The gasolines may be made wholly or partially from cracked stocks which stocks may be obtained by thermal and/or catalytic cracking methods. In such case, the gasolines will contain gum inhibitors and may or may not contain T.E.L. Generally automotive and aircraft gasolines contain both straight-run and cracked stocks with or without alkylated hydrocarbons, reformed hydrocarbons and the like. The preparation of straight-run, alkylated, reformed and cracked stocks for blending in the preparation of automotive gasolines, aircraft gasolines, and the like, are well known and need not be further described.

Gasolines in which the useful effect of the additives of this invention is observed may contain up to 3 or even as high as 5 ml. of tetraethyl lead per gallon and they will generally contain 5 to 15 pounds of a gum inhibitor per 1000 gallons. Whether TEL is present or not or whether the inhibitor is present or not does not alter the effect of the nitriles described. Moreover it is not important to this invention what type of inhibitor is used. The use of such inhibitors is well known in the art and need not be further described.

Since the nitriles employed are readily soluble in gasoline no difficulty is encountered in preparing the improved fuels of this invention. The nitriles may be separately added to and dissolved in the fuel or they may be dissolved in a portion of the gasoline and then further diluted with gasoline to produce the finished product. Preferably the additive will be added and mixed into the gasoline during the blending operations or at the time of incorporating lead and/or gum inhibitor in the gasoline or gasoline stocks.

Tests to determine the ORI characteristics of gasolines with and without the nitriles of this invention have been run in standard 1952, 1955 and 1956 Oldsmobile 8-cylinder engines equipped with 4 barrel carburetors. In these tests a clean engine is run on a dynamometer test stand with the fuel to be tested for a period of 160 hours using a cyclic operation involving alternate periods of high and low speeds which will be described more fully in connection with each engine. At the end of this period the carburetor is replaced with a "test" carburetor which is maintained in perfect operating condition and the spark plugs are also replaced with clean "rating" plugs. By using reference fuels of known octane rating (primary reference fuels) the octane requirement of the dirty engine is determined. At this time the cylinder head is removed and all combustion chamber deposits are removed. The cylinder head is replaced, and using the test carburetor and test spark plugs the octane requirement of the engine is again determined. The difference between the octane requirement of the dirty engine and the clean engine is the ORI produced by the gasoline under test. It is often referred to as the ORI of the gasoline.

In these tests the 1952 engine is operated for a total of 160 hours, equivalent to a road mileage of 6,400 miles. In this case the engine is operated for 36 seconds at 2000 r.p.m., a load of 46 pounds and at a brake horsepower of 23 and then for 24 seconds at 1100 r.p.m. a load of 15 pounds and at a brake horsepower of 4. This cycle is repeated during the entire run.

The 1955 and 1956 engines are operated for 160 hours, equivalent to a road mileage of 7680 miles. In this case the engine is operated for 27 seconds at 2000 r.p.m., a load of 46 pounds and a brake horsepower of 23 and then for 33 seconds at 1100 r.p.m. with no load and a brake horsepower of 0. This cycle is repeated throughout the test. In the case of both engines and throughout the tests, cooling water is controlled so as to maintain an outlet temperature of 165° F.±5° F. with an inlet temperature of 10° F. to 15° F. below the outlet temperature and oil temperatures are maintained at 175° F.±5° F. An S.A.E. 10–30 grade solvent treated paraffinic mineral oil for A.P.I. services MS, MM, ML, and DG is used in the crankcase and is changed after 60 and 120 hours of operation. Makeup oil is added each 8 hours as required to maintain the correct oil level in the engine.

The results of ORI tests on typical present day premium grade gasolines having 95 octane rating and containing straight run alkylate, reformate and catalytically cracked base stocks, 3 ml. of lead per gallon and 0.005% by weight of a phenolic type gum inhibitor with and without low molecular weight aliphatic nitriles are shown below.

Table I shows the results of tests in a 1952 Oldsmobile engine on two different gasolines of the type indicated above with and without added lower molecular weight aliphatic nitriles.

TABLE I
ORI tests in 1952 Oldsmobile engine

| Fuel | | Octane Requirement | | ORI | Additive Effect [a] |
|---|---|---|---|---|---|
| No. | Composition | Dirty | Clean | | |
| 1 | Base Fuel [b] | 85.0 | 76.6 | 8.4 | |
| 2 | Fuel No. 1 plus 19 ml./gal. acetonitrile. | 80.4 | 77.2 | 3.2 | 5.2 |
| 3 | Fuel No. 1 plus 19 ml./gal. propionitrile. | 82.5 | 76.8 | 5.7 | 2.7 |
| 4 | Fuel No. 1 plus 19 ml./gal. isopropyl cyanide. | 82.1 | 77.0 | 5.1 | 3.3 |
| 5 | Base Fuel [c] | 84.8 | 75.8 | 9.0 | |
| 6 | Fuel No. 5 plus 2 ml./gal. acetonitrile. | 84.0 | 76.6 | 7.4 | 1.6 |
| 7 | Fuel No. 5 plus 2 ml./gal. propionitrile. | 83.6 | 77.2 | 6.4 | 2.6 |
| 8 | Fuel No. 5 plus 5 ml./gal. isopropyl cyanide. | 83.0 | 76.9 | 6.1 | 2.9 |

[a] Difference between ORI of base fuel and base fuel plus nitrile.
[b] A commercial premium grade gasoline of 95 octane rating containing TEL and oxidation inhibitor.
[c] A different sample of a commercial gasoline as described in footnote b.

Table II shows the results of tests in 1955 and 1956 Oldsmobile engines on gasolines similar to those used in the 1952 engine tests.

TABLE II
ORI tests in 1955 and 1956 Oldsmobile engines

| Fuel | | Octane Requirement | | | ORI | Additive Effect [a] |
|---|---|---|---|---|---|---|
| No. | Composition | Engine | Dirty | Clean | | |
| 1 | Base Fuel [b] | 1955 | 94.2 | 87.6 | 6.6 | |
| 9 | Fuel No. 1 plus 19 ml./gal. acetonitrile. | 1955 | 92.0 | 87.1 | 4.9 | 1.7 |
| 10 | Fuel No. 1 plus 19 ml./gal. propionitrile. | 1955 | 93.2 | 87.4 | 5.8 | 0.8 |
| 11 | Fuel No. 1 plus 19 ml./gal. isopropyl cyanide. | 1955 | 92.0 | 87.3 | 4.7 | 1.9 |
| 12 | Fuel No. 1 plus 2 ml./gal. acetonitrile. | 1955 | 91.5 | 87.2 | 4.3 | 2.3 |
| 13 | Base Fuel [c] | 1956 | 98.1 | 90.5 | 7.6 | |
| 14 | Fuel No. 13 plus 2 ml./gal. isopropyl cyanide. | 1956 | 94.9 | 89.8 | 5.1 | 2.5 |

[a] Difference between ORI of base fuel and base fuel plus nitrile.
[b] See footnote b Table I.
[c] A premium gasoline similar to fuel No. 1.

Although the above-described engine tests were made with a gasoline containing tetraethyl lead and gum inhibitor, the advantageous ORI effects of the low molecular weight alkyl nitriles are observed as well in gasolines which do not contain tetraethyl lead and/or gum inhibitors. Engine tests on gasolines which do not contain lead and/or gum inhibitor substantiate this position. The amount of lead which may be employed in preparing gasolines to which the additives of this invention may be added may thus vary from 0 to as high as about 5 ml. of tetraethyl lead per gallon. Generally, automotive gasolines will contain 1 to 3 ml. of T.E.L. per gallon and aviation fuels may contain as high as 4.5 or 5 ml. per gallon.

Gum inhibitors which may be employed in amounts generally ranging from about 5 pounds to about 25 pounds per 1000 barrels of gasoline include substantially any of the gum inhibitors which are now universally employed in the preparation of automotive and aviation gasolines. The particularly preferred gum inhibitors are aromatic ring compounds having aliphatic and hydroxyl substituents. Ditertiarybutyl paracresol has been found to be very satisfactory. In view of the fact that gasoline inhibitors are well known in the art and are generally employed in today's gasolines, a further description of these materials is considered to be unnecessary.

The above description and examples of our invention

I claim:

1. An internal combustion engine fuel consisting essentially of hydrocarbons boiling in the gasoline boiling range and containing between about 0.015% and about 0.75% by weight of an aliphatic hydrocarbon mononitrile having 2 to 4 carbon atoms per molecule.

2. An internal combustion engine fuel according to claim 1 containing also between about 5 and about 25 pounds per thousand barrels of a gum inhibitor and up to about 5 ml. of tetraethyl lead per gallon.

3. An internal combustion engine fuel according to claim 1 in which said nitrile is acetonitrile.

4. An internal combustion engine fuel according to claim 1 in which said nitrile is propionitrile.

5. An internal combustion engine fuel according to claim 1 in which said nitrile is isopropylcyanide.

6. An internal combustion engine fuel consisting essentially of hydrocarbons boiling in the gasoline boiling range and containing up to about 5 ml. of tetraethyl lead per gallon, between about 5 and about 25 pounds per thousand barrels of a gum inhibitor, and between about 0.5 and about 25 ml. per gallon of an aliphatic hydrocarbon mononitrile having 2 to 4 carbon atoms per molecule.

7. A composition according to claim 6 in which said nitrile is acetonitrile.

8. A composition according to claim 6 in which said nitrile is propionitrile.

9. A composition according to claim 6 in which said nitrile is isopropylcyanide.

References Cited in the file of this patent

UNITED STATES PATENTS

| | | |
|---|---|---|
| 1,690,988 | Marley et al. | Nov. 6, 1928 |
| 1,883,593 | Cross | Oct. 18, 1932 |
| 1,958,744 | Cross | May 15, 1934 |
| 2,128,987 | Christensen | Sept. 6, 1938 |
| 2,202,877 | Stevens et al. | June 4, 1940 |
| 2,222,649 | Boyd | Nov. 26, 1940 |